(12) United States Patent
Kim et al.

(10) Patent No.: US 11,372,452 B2
(45) Date of Patent: Jun. 28, 2022

(54) DISPLAY DEVICE

(71) Applicant: Samsung Display Co., LTD., Yongin-si (KR)

(72) Inventors: Tae-Chang Kim, Anyang-si (KR); Minseop Kim, Cheonan-si (KR); Changmin Park, Gwangmyeong-si (KR); Sungwoo Cho, Hwaseong-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 155 days.

(21) Appl. No.: 16/935,292

(22) Filed: Jul. 22, 2020

(65) Prior Publication Data

US 2021/0141420 A1    May 13, 2021

(30) Foreign Application Priority Data

Nov. 7, 2019 (KR) .................. 10-2019-0141824

(51) Int. Cl.
  *G06F 1/16* (2006.01)
(52) U.S. Cl.
  CPC .......... *G06F 1/1652* (2013.01); *G06F 1/1681* (2013.01)
(58) Field of Classification Search
  CPC .... G06F 1/1652; G06F 1/1616; G06F 1/1618; G06F 1/1681; G06F 1/1633; G06F 1/1637; H04M 1/0214; H04M 1/0216; H04M 1/0247; H04M 1/0269
  See application file for complete search history.

(56) References Cited

U.S. PATENT DOCUMENTS

| 9,119,316 | B2 * | 8/2015 | Lee | H05K 7/16 |
| 9,348,450 | B1 * | 5/2016 | Kim | G06F 1/1616 |
| 9,557,771 | B2 * | 1/2017 | Park | G06F 1/1681 |
| 9,958,976 | B2 * | 5/2018 | Endo | H01L 51/5237 |
| 10,424,749 | B2 | 9/2019 | Kim | |
| 10,475,864 | B2 * | 11/2019 | Chun | H01L 27/3237 |
| 10,520,992 | B1 * | 12/2019 | Chang | G06F 1/1616 |
| 10,551,880 | B1 * | 2/2020 | Ai | G06F 1/1652 |

(Continued)

FOREIGN PATENT DOCUMENTS

| KR | 10-1911047 B1 | 10/2018 |
| KR | 1020180131260 A | 12/2018 |
| KR | 1020190043826 A | 4/2019 |

OTHER PUBLICATIONS

Dialog search report (Year: 2022).*

*Primary Examiner* — Hung S. Bui
*Assistant Examiner* — Sagar Shrestha
(74) *Attorney, Agent, or Firm* — Cantor Colburn LLP

(57) ABSTRACT

The display device includes a display module which displays an image at a front surface of the display module and includes a rear surface, a folding area and a non-folding area extended from the folding area; and a supporter facing the rear surface of the display module and including a first portion corresponding to the non-folding area, a second portion corresponding to the folding area, and a boundary between the first portion and the second portion. The display module which is unfolded disposes the supporter bent at the boundary, and the supporter which is bent includes the first portion and the second portion together forming a curvature of the supporter having a center of curvature at the front surface of the display module.

20 Claims, 11 Drawing Sheets

(56) References Cited

U.S. PATENT DOCUMENTS

| | | | |
|---|---|---|---|
| 10,620,668 B2* | 4/2020 | Park | G06F 1/1652 |
| 10,838,457 B2* | 11/2020 | Yu | G06F 1/1652 |
| 11,073,863 B2* | 7/2021 | Kim | G06F 1/1652 |
| 2012/0264489 A1* | 10/2012 | Choi | G06F 1/1652 |
| | | | 455/566 |
| 2013/0021762 A1* | 1/2013 | van Dijk | H04M 1/022 |
| | | | 361/749 |
| 2013/0037228 A1* | 2/2013 | Verschoor | G06F 1/1652 |
| | | | 160/377 |
| 2016/0048169 A1* | 2/2016 | Yang | G06F 1/1652 |
| | | | 361/749 |
| 2016/0209874 A1* | 7/2016 | Choi | H05K 1/028 |
| 2016/0302316 A1* | 10/2016 | Jeong | H05K 5/0226 |
| 2018/0095502 A1* | 4/2018 | Yamazaki | F16M 11/38 |
| 2018/0335679 A1* | 11/2018 | Hashimoto | G02F 1/16753 |
| 2020/0019212 A1* | 1/2020 | Jung | G06F 1/1652 |
| 2020/0057471 A1* | 2/2020 | Nam | H01L 51/0097 |
| 2020/0218311 A1* | 7/2020 | Park | G09F 9/301 |
| 2020/0355216 A1* | 11/2020 | Bae | G06F 1/1681 |

* cited by examiner

DISPLAY DEVICE

This application claims priority to Korean Patent Application No. 10-2019-0141824, filed on Nov. 7, 2019, and all the benefits accruing therefrom under 35 U.S.C. § 119, the entire contents of which are hereby incorporated by reference.

BACKGROUND

(1) Field

The present disclosure herein relates to a display device, and more particularly, to a foldable display device.

(2) Description of the Related Art

Electronic devices such as smart phones, digital cameras, notebook computers, navigation devices, and smart televisions that provide images to a user include display devices for displaying images. The display device generates an image and provides the image to a user through a display screen.

Various types of display devices have been developed. For example, various flexible display devices that can be deformed, folded or rolled into a curved shape are being developed. The flexible display device whose shape may be changed variously may have improved mobility and may improve the convenience of use thereof.

SUMMARY

The present disclosure provides a display device which reduces deformation caused by folding.

An embodiment of the invention provides a display device including: a display module which displays an image at a front surface of the display module and includes a rear surface, a folding area and a non-folding area extended from the folding area; and a supporter facing the rear surface of the display module and including a first portion corresponding to the non-folding area, a second portion corresponding to the folding area, and a boundary between the first portion and the second portion. The display module which is unfolded disposes the supporter bent at the boundary, and the supporter which is bent includes the first portion and the second portion together forming a curvature of the supporter having a center of curvature at the front surface of the display module.

In an embodiment, the display module which is unfolded may dispose the non-folding area bent to have a center of curvature at the front surface.

In an embodiment, the display module which is unfolded may dispose the folding area bent to have a center of curvature below the rear surface of the display module.

In an embodiment, the supporter which is bent may further include: an upper surface facing the display module and a lower surface opposite to the upper surface, and the lower surface of the supporter at the first portion and at the second portion thereof, together may provide a continuous curved surface having the center of curvature at the front surface of the display module.

In an embodiment, the non-folding area of the display module may be provided in plurality including a first non-folding area and a second non-folding area opposing each other with the folding area therebetween, the supporter which is bent may be provided in plural including a first supporter corresponding to the first non-folding area and a second supporter corresponding to the second non-folding area, and the first supporter and the second supporter may be spaced apart from each other.

In an embodiment, the display device may further include: an adhesive layer between the non-folding area of the display module and the supporter, and a compensation layer between the folding area of the display module and the supporter. The adhesive layer may be attached to the supporter and to the display module at the non-folding area thereof, to attach the supporter to the display module, and the compensation layer may be attached to the supporter and unattached to the display module at the folding area thereof.

In an embodiment, the display device may further include a folding structure with which folding and unfolding of the display module is controllable, the folding structure facing the display module with the supporter therebetween and including: a first connection portion corresponding to the first non-folding area and extending from the first non-folding area to correspond to the folding area, a second connection portion corresponding to the second non-folding area and extending from the second non-folding area to correspond to the folding area, and a hinge portion which corresponds to the folding area and couples the first connection portion and the second connection portion to each other. The display module which is unfolded may dispose each of the first connection portion and the second connection portion flat.

In an embodiment, the second portion may be spaced apart from the folding structure.

In an embodiment, the display device may further include a single plane facing the display module with the supporter therebetween. The supporter which is bent may further include: the lower surface at the second portion defining a lowest point of the supporter which is closest to the single plane, and the lower surface at the first portion defining a highest point of the supporter which is furthest from the single plane.

In an embodiment, the display module which is unfolded may disposes a maximum distance between the lowest point of the supporter and the highest point of the supporter of about 0.5 millimeter or less.

In an embodiment, the folding area may be foldable based on a folding axis, the first supporter may be bendable based on a first bending axis parallel to the folding axis, and the second supporter may be bendable based on a second bending axis parallel to the folding axis.

In an embodiment, the display module which is folded may dispose the first connection portion and the second connection portion facing each other, with both of the first non-folding area and the second non-folding area of the display module therebetween.

In an embodiment, a display device includes: a display module which displays an image at a front surface of the display module, the display module including: a rear surface opposite to the front surface, a folding area at which the display module is foldable and unfoldable, and a non-folding area extended from the folding area; a supporter facing the rear surface of the display module, the supporter including: a first portion corresponding to the non-folding area of the display module, a second portion extended from the first portion to correspond to the folding area of the display module, and a boundary between the first portion and the second portion; and a folding structure with which folding and unfolding of the display module is controllable, the folding structure facing the display module with the supporter therebetween and including: a connection portion corresponding to the non-folding area and extending from the non-folding area to correspond to the folding area, and a hinge portion which corresponds to the folding area. The display module which is unfolded disposes the supporter bent at the boundary and disposes the connection portion flat, and the supporter which bent includes the second portion protruded further from the connection portion than the first portion, in a direction from the connection portion to the front surface of the display module.

In an embodiment, the supporter which is bent may include the first portion and the second portion together forming a curvature of the supporter having a center of curvature at the front surface of the display module.

In an embodiment, the display module which is unfolded may dispose the non-folding area bent to have a center of curvature at the front surface.

In an embodiment, the display module which is unfolded may dispose the folding area bent to have a center of curvature below the rear surface of the display module.

In an embodiment, the supporter which is bent may further include: an upper surface facing the display module and a lower surface opposite to the upper surface, and the lower surface of the supporter at the first portion and at the second portion thereof, together provide a continuous curved surface having a center of curvature at the front surface of the display module.

In an embodiment, the display device may further include: an adhesive layer between the non-folding area of the display module and the supporter, and a compensation layer between the folding area of the display module and the supporter. The adhesive layer may be attached to the supporter and to the display module at the non-folding area thereof, to attach the supporter to the display module, and the compensation layer may be attached to the supporter and unattached to the display module at the folding area thereof.

In an embodiment, the display module which is folded may dispose the compensation layer spaced apart from the display module at the folding area thereof.

In an embodiment, in a top plan view of the display module which is folded, the hinge portion may correspond to the connection portion and may be outside the supporter.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
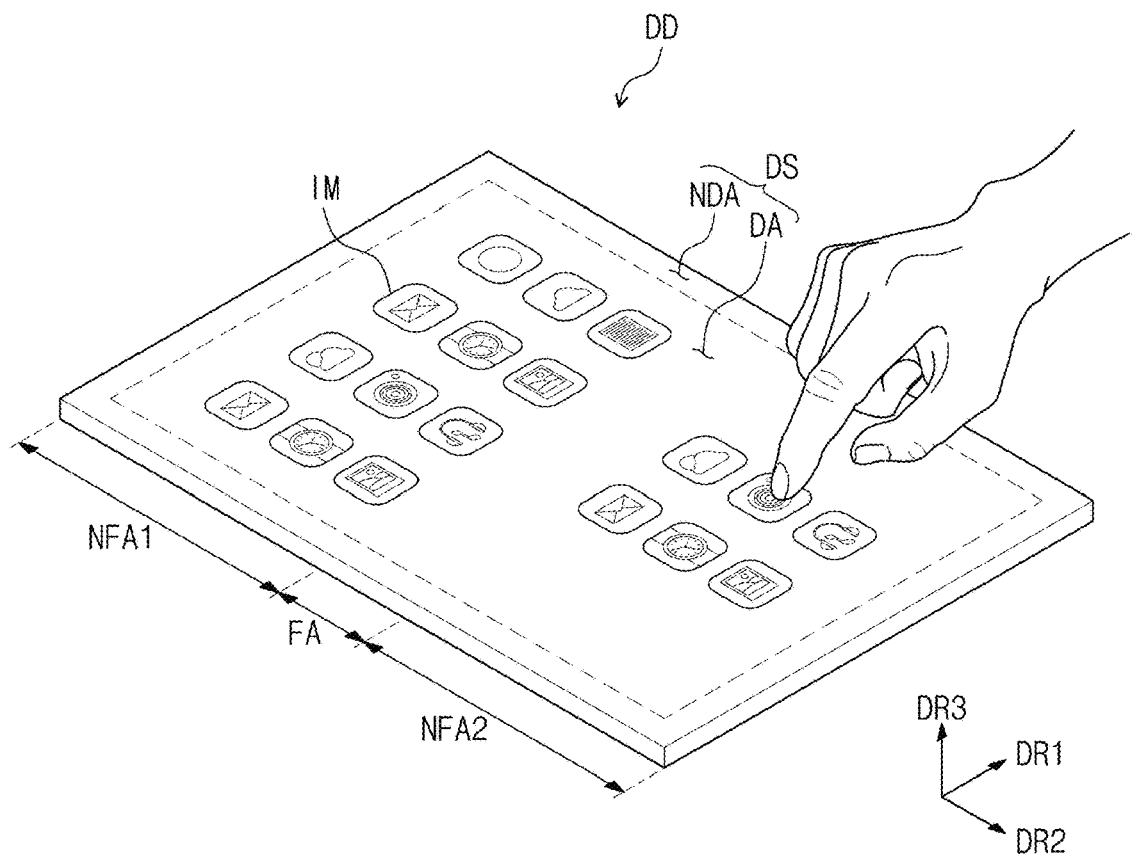
FIG. 1 is a perspective view of an embodiment of a display device.

Various modifications are possible in various embodiments of the invention and specific embodiments are illustrated in drawings and related detailed descriptions are listed. However, this does not limit various embodiments of the invention to a specific embodiment and it should be understood that the invention covers all the modifications, equivalents, and/or replacements of this disclosure provided they come within the scope of the appended claims and their equivalents.

Like reference numerals refer to like elements throughout the drawings. In the drawings, the thickness or size of each layer is exaggerated, omitted, or schematically illustrated for convenience in description and clarity.

It will be understood that the terms "first" and "second" are used herein to describe various components but these components should not be limited by these terms. The above terms are used only to distinguish one component from another. For example, a first component may be referred to as a second component and vice versa without departing from the scope of the invention.

The singular expressions include plural expressions unless the context clearly dictates otherwise. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

In addition, terms such as "below," "lower," "on" and "upper" are used to describe a relationship of configurations shown in the drawing. The terms are described as a relative concept based on a direction shown in the drawing.

Additionally, in various embodiments of the invention, the term "include," "comprise," "including," or "comprising," specifies a property, a region, a fixed number, a step, a process, an element and/or a component but does not exclude other properties, regions, fixed numbers, steps, processes, elements and/or components.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Among display devices which are flexible, the display device DD which is foldable includes a display module DM that is foldable based on a folding axis FX extending along one direction. The display module DM may be foldable or unfoldable with respect to the folding axis FX. There is a demand for reducing damage to a display device DD due to folding thereof.

Figure 2:
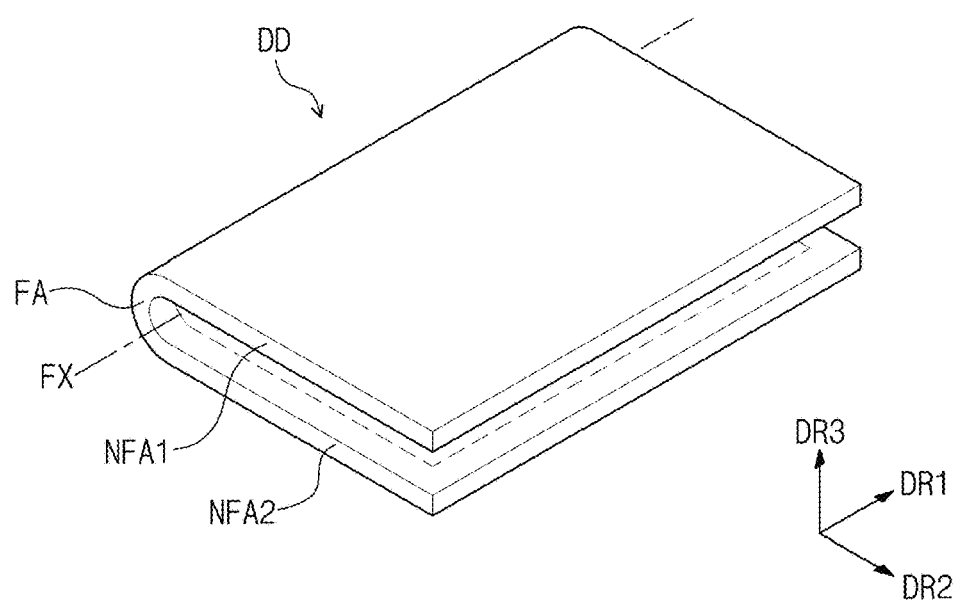
FIG. 2 is a perspective view illustrating an embodiment of the display device of FIG. 1, which is folded.

FIG. 1 is a perspective view of an embodiment of a display device DD. FIG. 2 is a perspective view illustrating the display device DD of FIG. 1 which is folded. Referring to FIGS. 1 and 2, a display device DD may have a rectangular planar shape defining short sides lengthwise extended along a first direction DR1 and long sides lengthwise extended along a second direction DR2 that intersects the first direction DR1. However, the invention is not limited thereto, and the display device DD may have various shapes. The display device DD and components thereof may be disposed in a plane which is parallel to a plane defined by the first direction DR1 and the second direction DR2. A thickness (e.g., thickness direction) of the display device DD and components thereof is defined along a third direction DR3 which crosses each of the first direction DR1 and the second direction DR2.

The display device DD may be flexible (e.g., a flexible display device) and may be foldable (e.g., a folding display device) that is foldable and/or unfoldable with respect to a folding axis FX extending along the first direction DR1.

A front surface of the display device DD may be defined as a display surface DS. An image IM generated by the display device DD may be provided to outside the display device DD (e.g., to a user of the display device DD) through the display surface DS. The display surface DS may include a display area DA at which an image IM is displayed or displayable, and a non-display area NDA adjacent to the display area DA and at which the image IM is not displayed or not displayable. In an embodiment, the non-display area NDA may surround the display area DA in a top plan view, and may define an outline portion of the display device DD. The non-display area NDA may be defined by a printing of predetermined color, e.g., a colored material which is printed at an area outside of the display area DA. Components of the display device DD may have a display area DA and a non-display area NDA corresponding to those of the display device DD described above.

The display device DD may include a folding area FA, and a plurality of non-folding areas including a first non-folding area NFA1 and a second non-folding area NFA2 (e.g., the first and second non-folding areas NFA1 and NFA2). Referring to FIG. 1, for example, one folding area FA and two non-folding areas are illustrated, but the number of the folding area FA and the non-folding areas is not limited thereto. The display device DD which is flat or unfolded, may dispose the folding area FA between the first non-folding area NFA1 and the second non-folding area NFA2, along the first direction DR1 and/or the second direction DR2. The folding area FA and the first and second non-folding areas NFA1 and NFA2 may be arranged along the second direction DR2. The folding area FA may overlap or correspond to the folding axis FX.

The display device DD and components thereof may be foldable at the folding area FA, while being maintained flat or unfoldable at a non-folding area. As one or more components of the display device DD are bent at the folding area FA, the display device DD may be folded. Referring to FIG. 2, the display device DD may be in-folded to dispose portions of the display surface DS facing each other and not facing outside the display device DD.

Figure 3:
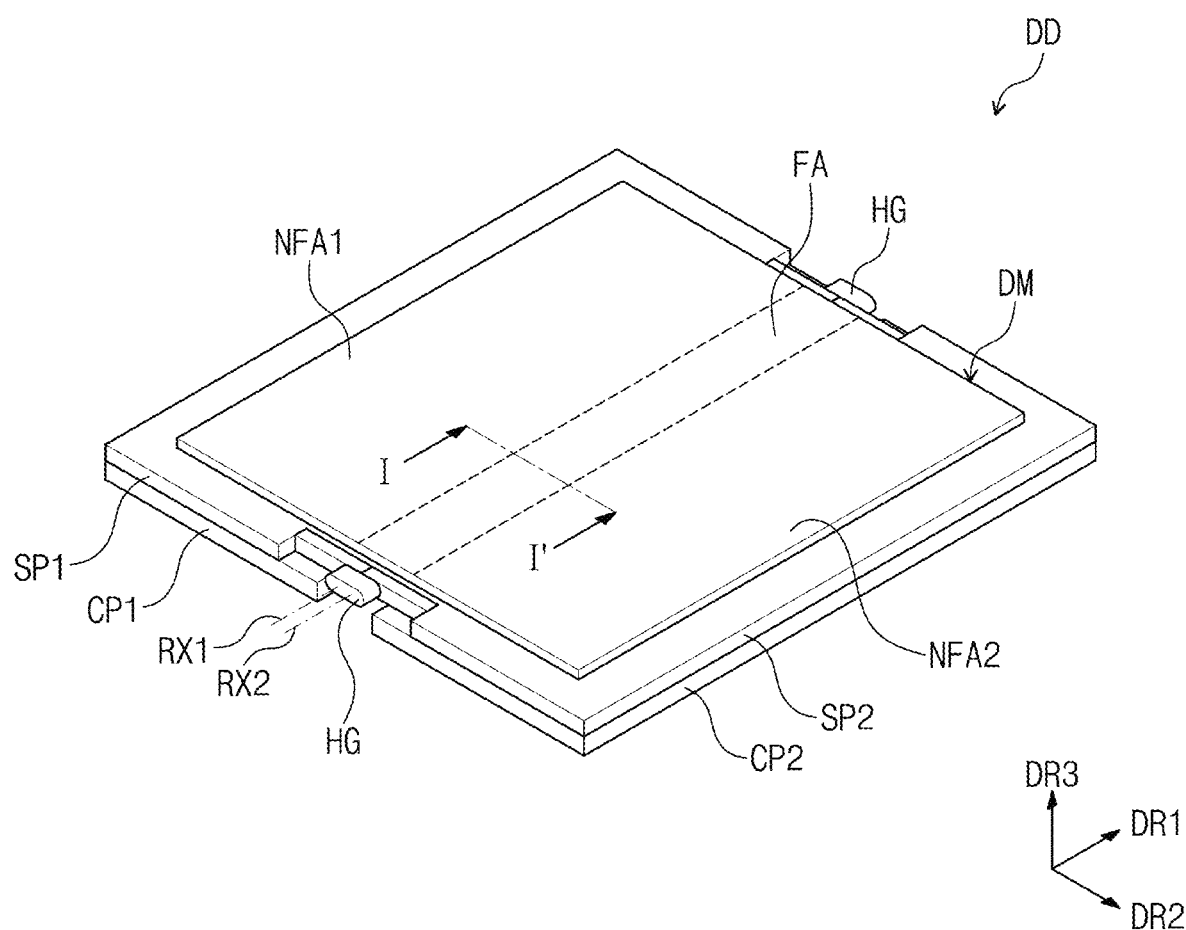
FIG. 3 is a perspective view of an embodiment of the display device of FIG. 1, which is unfolded.
Figure 4:
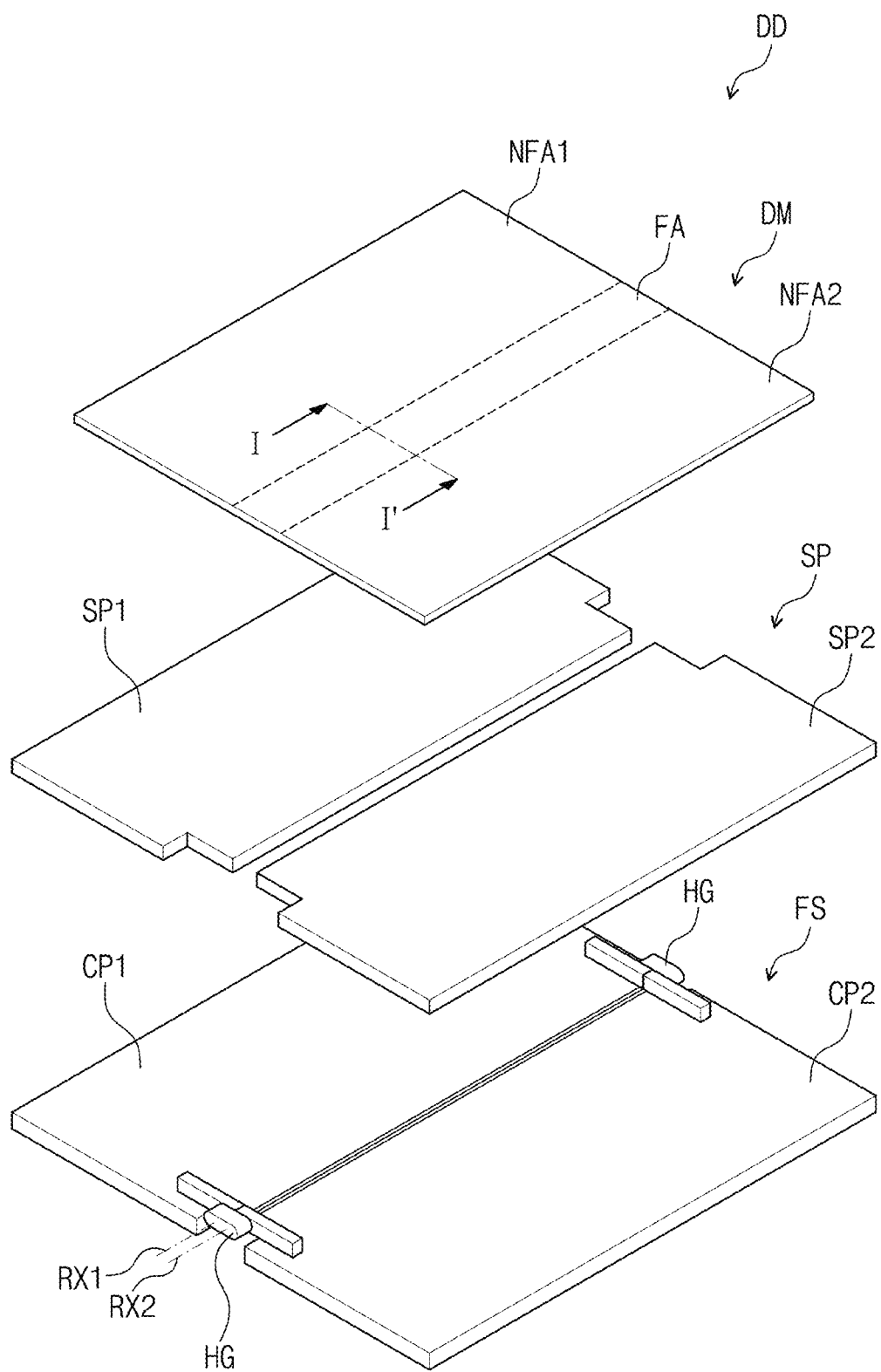
FIG. 4 is an exploded perspective view of an embodiment of the display device of FIG. 3.

FIG. 3 is a perspective view of an embodiment of the display device DD of FIG. 1. FIG. 4 is an exploded perspective view of the display device DD of FIG. 3. Referring to FIGS. 3 and 4, the display device DD may include a display module DM, a module supporter SP, and a folding structure FS. The display module DM may include the folding area FA and the first and second non-folding areas NFA1 and NFA2, which respectively correspond to the folding area FA and the first and second non-folding areas NFA1 and NFA2 of FIG. 1, respectively. The display module DM may be a display module DM which is flexible.

The module supporter SP may include a first supporter SP1 and a second supporter SP2. The first supporter SP1 and the second supporter SP2 are separated and spaced apart from each other along the second direction DR2. The module supporter SP may be disposed between the display module DM and the folding structure FS along a thickness direction of the display device DD, and may be attached to the display module DM such as through an adhesive material. The module supporter SP may be disposed between the display module DM and the folding structure FS to reduce or effectively prevent damage to the display module DM by the folding structure FS, during folding and/or unfolding of the display device DD. In one example, the module supporter SP may be a metal plate.

The first supporter SP1 may overlap or correspond to the first non-folding area NFA1 and a portion of the folding area FA. The first supporter SP1 may be disposed below the first non-folding area NFA1 and the portion of the folding area FA so as to support the first non-folding area NFA1 and the portion of the folding area FA. The first supporter SP1 may be attached to the first non-folding area NFA1 such as through an adhesive material. The first supporter SP1 may not be attached to the folding area FA so as not to limit bending of the folding area FA in folding or unfolding of the display module DM. The first supporter SP1 of the module supporter SP may move together with the corresponding portion of the display module DM.

The second supporter SP2 may overlap or correspond to the second non-folding area NFA2 and a portion of the folding area FA. The second supporter SP2 may be disposed below the second non-folding area NFA2 and the portion of the folding area FA so as to support the second non-folding area NFA2 and the portion of the folding area FA. The second supporter SP2 may be attached to the second non-folding area NFA2 such as through an adhesive material. The second supporter SP2 may not be attached to the folding area FA so as not to limit bending of the folding area FA in folding or unfolding of the display module DM. The second supporter SP2 of the module supporter SP may move together with the corresponding portion of the display module DM.

The folding structure FS may include a first connection part CP1 (e.g., first connection portion), a second connection part CP2 (e.g., second connection portion), and a hinge part HG (e.g., hinge or hinge portion). The folding structure FS may be disposed under the module supporter SP. The folding structure FS may face the display module DM with the module supporter SP therebetween. The folding and unfolding of the display module DM may be controllable by the folding structure FS. The display module DM which is flat or unfolded disposes each of the first connection part CP1 and the second connection part CP2 flat. In an embodiment, an entirety of a respective connection part may be disposed flat or more than one connection part may be disposed in a same plane (e.g., coplanar) with each other.

The first connection part CP1 may overlap or correspond to the first supporter SP1 and may face the first non-folding area NFA1 with the first supporter SP1 therebetween. The first connection part CP1 may overlap or correspond to the first non-folding area NFA1 and a portion of the folding area FA. The second connection part CP2 may overlap or correspond to the second supporter SP2 and may face the second non-folding area NFA2 with the second supporter SP2 therebetween. The second connection part CP2 may overlap correspond to the second non-folding area NFA2 and a portion of the folding area FA. The first connection part CP1 and the second connection part CP2 may be disposed adjacent to each other along the second direction DR2.

The hinge part HG may be provided in plurality (e.g., hinge parts HG). Each one of the hinge parts HG is coupled to the first connection part CP1 and the second connection part CP2. The hinge parts HG may be respectively disposed at each of opposing sides of the first and second connection parts CP1 and CP2 so as to face each other along the first direction DR1. Referring to FIG. 3 and FIG. 4, two of the hinge parts HG are shown, but the number of the hinge parts HG is not limited. One side (e.g., a first end) of the hinge parts HG may be coupled to the first connection part CP1, and the other side (e.g., a second end opposing the first end) may be coupled to the second connection part CP2. The hinge parts HG may be disposed non-overlapping with the display module DM and/or the module supporter SP. That is, the hinge parts HG may be disposed outside an outer edge or outer side surface of the display module DM and/or the module supporter SP, so as to not correspond to the display module DM and/or the module supporter SP. In an embodiment, for example, the hinge parts HG may be disposed on the first and second connection parts CP1 and CP2, but are not limited thereto. That is, the hinge parts HG may correspond to a portion of the folding structure FS, such as the first and second connection parts CP1 and CP2.

The hinge parts HG may provide or define the folding axis FX (see FIG. 1) extending along the first direction DR1. The hinge parts HG may be foldable at a boundary between the first connection part CP1 and the second connection part CP2, such that the display module DM is foldable with respect to the folding axis FX of FIG. 1. According to the folding of the folding structure FS at the first connection part CP1 and the second connection part CP2, the display module DM may be folded. That is, the hinge parts HG may be foldable together with the display module DM.

The hinge parts HG may fold the folding structure FS at the first connection part CP1 and the second connection part CP2, based on biaxial rotation axes. In an embodiment, for example, the hinge parts HG may provide or define a first rotation axis RX1 and a second rotation axis RX2 of the display device DD that each extends along the first direction DR1. The first rotation axis RX1 and the second rotation axis RX2 are spaced apart from each other along the second direction DR2. Each of the first connection part CP1 and the second connection part CP2 may be rotatable about the first rotation axis RX1 and the second rotation axis RX2. However, the invention is not limited thereto, and the hinge parts HG may provide a number of rotation axes other than two.

Figure 5:
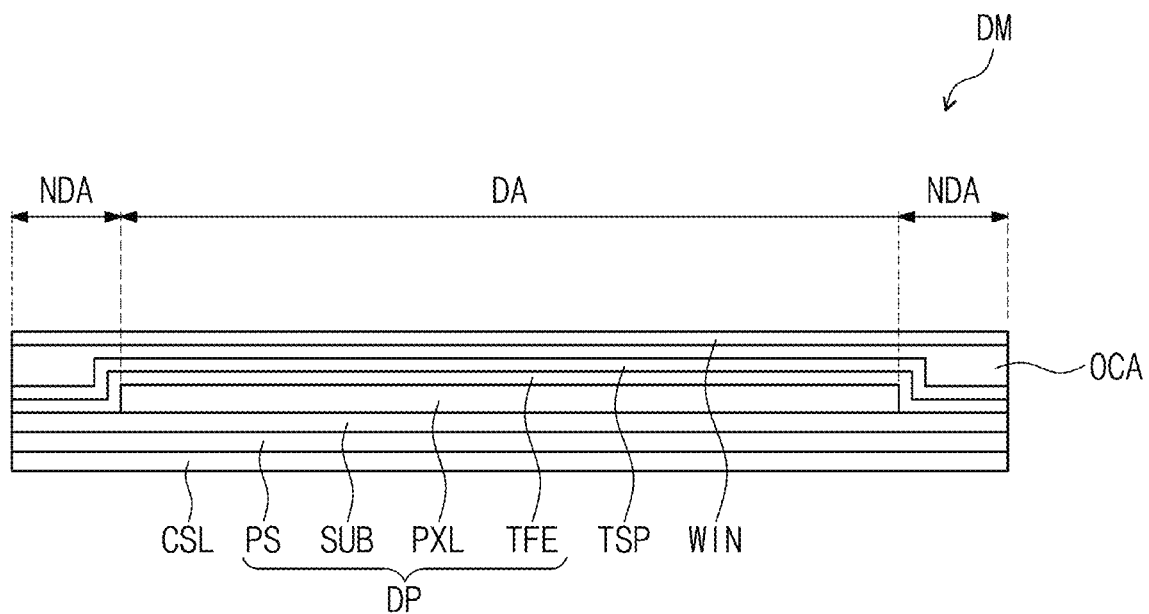
FIG. 5 is a cross-sectional view of an embodiment of the display module illustrated in FIGS. 3 and 4.

FIG. 5 is a cross-sectional view of the display module DM illustrated in FIGS. 3 and 4. Referring to FIG. 5, the display module DM may include a display panel DP, a touch detection unit TSP (e.g., touch detection panel) disposed on the display panel DP, a window WIN disposed on the touch detection unit TSP, a coupling member (e.g., an adhesive OCA) disposed between the touch detection unit TSP and the window WIN, and a cushion layer CSL disposed under the display panel DP.

The display panel DP may generate and/or emit light (e.g., a light-emitting type), but is not particularly limited. In an embodiment, for example, the display panel DP may be an organic light emitting display panel or a quantum dot light emitting display panel. A light generating and/or emitting layer of the organic light emitting display panel may include an organic light emitting material. A light generating and/or emitting layer of the quantum dot light emitting display panel may include quantum dot, quantum rod, and the like. Hereinafter, the display panel DP is described as an organic light emitting display panel.

The display panel DP may include a substrate SUB, a pixel layer PXL (e.g., light-generating layer or image display layer) disposed on the substrate SUB, a thin film sealing layer TFE (e.g., encapsulation layer or sealing layer) disposed on the substrate SUB to cover the pixel layer PXL, and a protection substrate PS (e.g., protection layer) disposed under the substrate SUB. The substrate SUB may be transparent. The substrate SUB may include plastic and may be flexible. In an embodiment, for example, the substrate SUB may include polyimide ("PI").

The substrate SUB may include a display area DA and a non-display area NDA which is adjacent to the display area DA, such as described above for the display surface DS of the display device DD. The pixel layer PXL may be disposed on the display area DA of the substrate SUB. The pixel layer PXL may correspond to the display area DA. The pixel layer PXL may include or define a pixel PX which is provided in plurality (e.g., a plurality of pixels PX), and each of the pixels may include a light emitting element. An image IM may be generated and/or displayed by the pixel layer PXL, without being limited thereto.

The thin film sealing layer TFE may include at least two inorganic layers, and an organic layer which is disposed between the inorganic layers. The inorganic layers may include an inorganic material and may protect the pixel layer PXL from moisture and/or oxygen. The organic layer may include an organic material and may protect the pixel layer PXL from foreign substances such as dust particles.

The protection substrate PS may protect a lower part of the substrate SUB. The protection substrate PS may include a flexible plastic substrate. In an embodiment, for example, the protection substrate PS may include polyethylene terephthalate ("PET").

The touch detection unit TSP may detect an external input (for example, a contact to or proximate to the display device DD or component thereof, such as from an input tool, a user's touch, etc.), change the predetermined input signal, and provide the input signal to the display panel DP. The touch detection unit TSP may include a plurality of sensor units (not shown) for detecting an external input. The touch sensor units can sense an external input in a capacitive manner. The display panel DP may receive an input signal from the touch detection unit TSP and generate an image corresponding to the input signal.

The window WIN may protect the display panel DP and the touch detection unit TSP from external scratches and impacts. The window WIN may be attached to the touch detection unit TSP such as by an adhesive OCA. The adhesive OCA may include an optical clear adhesive. The image generated by the display panel DP may be provided to outside the display device DD through the window WIN. The window WIN may provide or define an outermost surface of the display device DD. The window WIN may provide or define the display surface DS, without being limited thereto.

The cushion layer CSL may protect the display panel DP by absorbing an external shock applied to the lower part of the display module DM. The cushion layer CSL may include a foam material, such as in the form of a sheet, having a predetermined elastic force.

Figure 6:
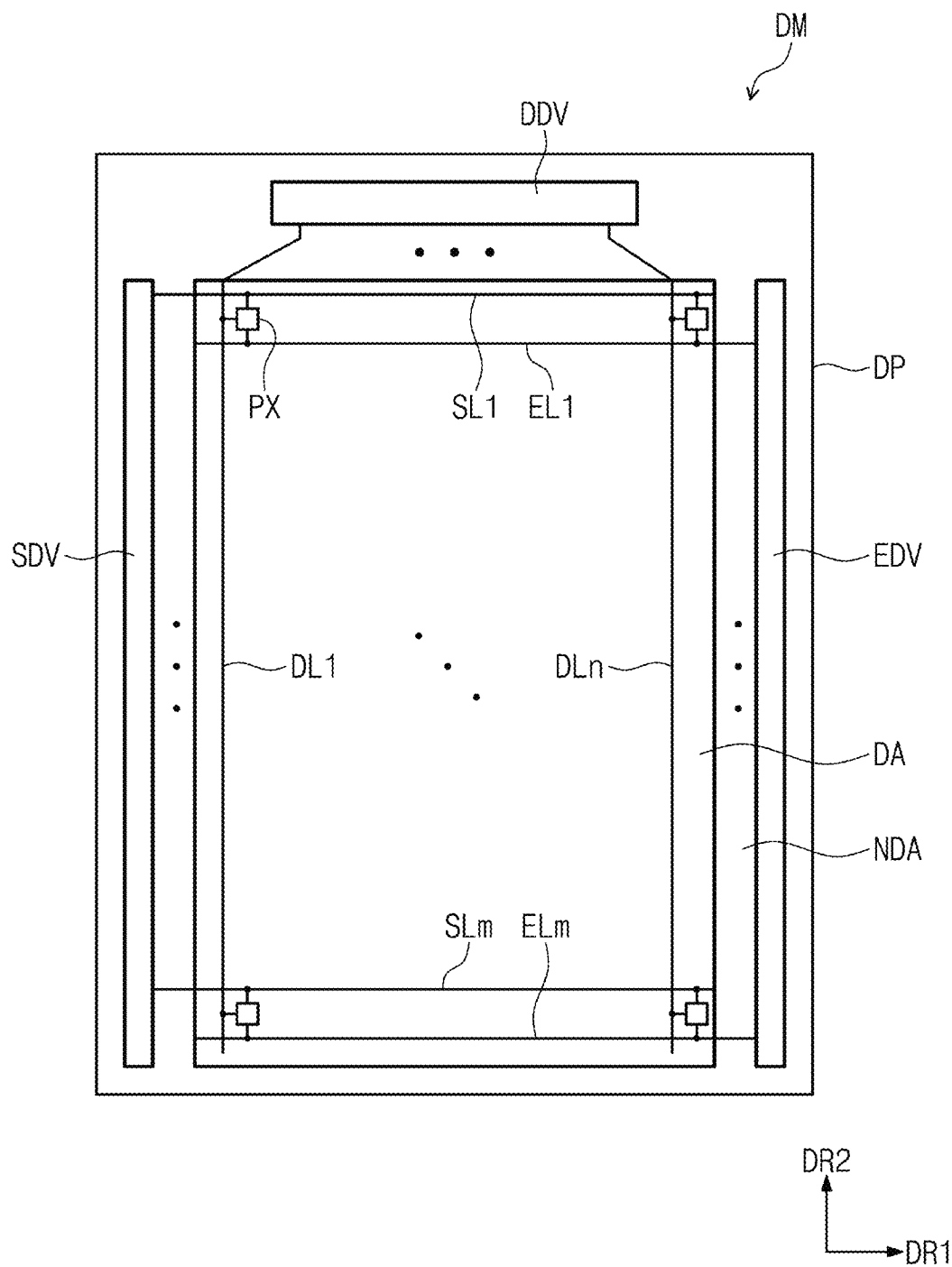
FIG. 6 is a top plan view of an embodiment of the display module illustrated in FIG. 5.

FIG. 6 is a top plan view of the display module DM illustrated in FIG. 5. Referring to FIG. 6, a display module DM may include the display panel DP, a scan driver SDV, a data driver DDV, and an emission driver EDV. FIG. 6 illustrates a planar configuration of the display panel DP of the display module DM, and a planar configuration of the touch detection unit TSP is omitted for convenience of illustration.

The display panel DP may be flexible. In an embodiment, for example, the display panel DP may include a plurality of electronic elements disposed on the substrate SUB which is flexible. The display panel DP may have a rectangular shape defining short sides extended along the first direction DR1 and long sides extended along the second direction DR2. The display panel DP may include a display area DA and a non-display area NDA which is adjacent to the display area DA, similar to that described for the display surface DS of FIG. 1.

The display panel DP may include a plurality of pixels PX, a plurality of scan lines SL1 to SLm, a plurality of data lines DL1 to DLn, and a plurality of emission lines EL1 to ELm. Here, 'm' and 'n' are natural numbers. The pixels PX may be arranged in a matrix form along the first direction DR1 and the second direction DR2, but are not limited thereto and may be arranged in various forms. The pixels PX may be disposed in the display area DA and may be variously connected to the scan lines SL1 to SLm, the data lines DL1 to DLn, and the emission lines EL1 to ELm.

The scan driver SDV, the data driver DDV, and the emission driver EDV may be disposed in the non-display area NDA. The scan driver SDV and the emission driver EDV may be disposed adjacent to the long sides of the display panel DP, respectively. The data driver DDV may be provided in the form of an integrated circuit chip and disposed adjacent to a short side of the display panel DP. However, the invention is not limited thereto, and the data driver DDV may be mounted on a flexible circuit board (not shown) which is a separate element from and connected to the display panel DP. The data driver DDV may be connected to the display panel DP through the flexible circuit board. An electrical signal may be provided from outside the display panel DP, through the flexible circuit board, without being limited thereto.

The scan lines SL1 to SLm may lengthwise extend along the first direction DR1 and may be connected to the scan driver SDV. The data lines DL1 to DLn lengthwise extend along the second direction DR2 and may be connected to the data driver DDV. The emission lines EL1 to ELm may lengthwise extend along the first direction DR1 and may be connected to the emission driver EDV.

The scan driver SDV generates a plurality of scan signals as electrical signals, and the scan signals may be applied from the scan driver SDV to the pixels PX through the scan lines SL1 to SLm. The scan signals may be sequentially applied to the pixels PX. The data driver DDV generates a plurality of data voltages as electrical signals, and the data voltages may be applied from the data driver DDV to the pixels PX through the data lines DL1 to DLn. The emission driver EDV generates a plurality of emission signals as electrical signals, and the emission signals may be applied from the emission driver EDV to the pixels PX through the emission lines EL1 to ELm.

Although not shown the drawing, the display module DM may include a timing controller (not shown) for controlling operations of the scan driver SDV, the data driver DDV, and/or the emission driver EDV.

The timing controller may generate a scan control signal, a data control signal, and an emission control signal in response to control signals (e.g., electrical signals) received from outside the display panel DP. The timing controller receives the image signals from outside of the display panel DP, and converts the data format of the image signals to match the interface specification with the data driver DDV, and provides the converted image data to the data driver DDV.

The scan driver SDV may generate scan signals in response to the scan control signal, and the emission driver EDV may generate emission signals in response to the emission control signal. The data driver DDV is provided with the image signals whose data format is converted, and can generate the data voltages corresponding to the image signals in response to the data control signal.

The pixels PX may be provided with the data voltages in response to the scan signals. The pixels PX generate and/or display an image by generating and/or emitting light of a luminance corresponding to the data voltages. The emission time of the pixels PX may be controlled by emission signals. The pixel PX may provide a region at which light is generated, light is emitted, an image IM is displayed, etc.

Figure 7:
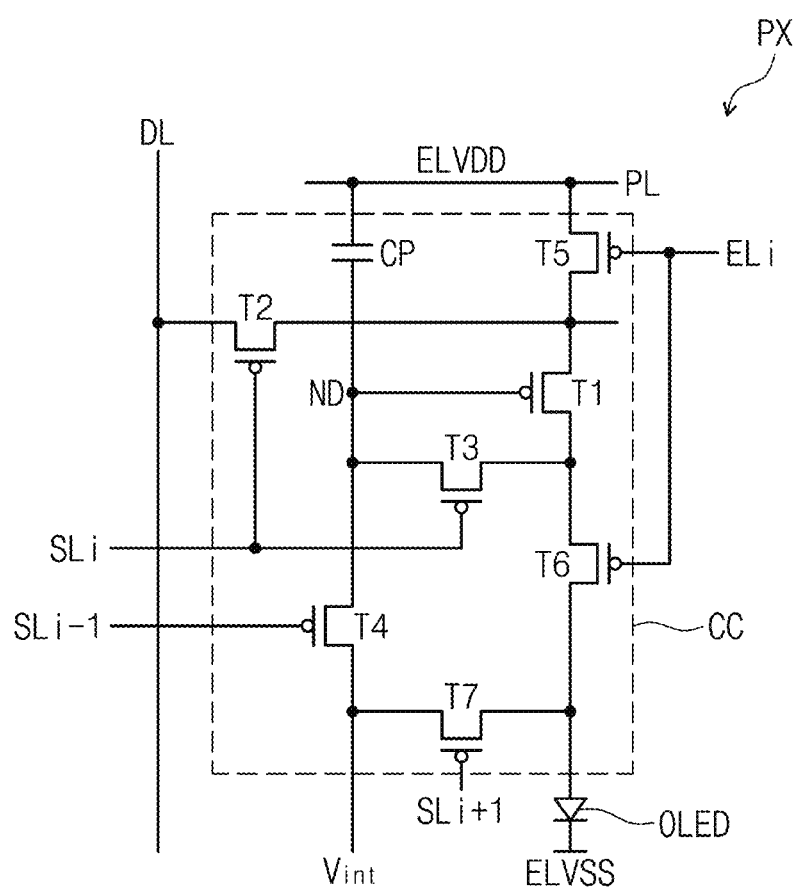
FIG. 7 is an equivalent circuit diagram of an embodiment of a pixel shown in FIG. 6.

FIG. 7 is an equivalent circuit diagram of an embodiment of a pixel PX shown in FIG. 6. Referring to FIG. 7, the pixel PX may include a light emitting element OLED and a pixel circuit CC. The pixel circuit CC may include a plurality of transistors T1 to T7 and a capacitor CP. The pixel circuit CC may be connected to the light emitting element OLED and control the OLED to generate and/or emit light. The pixel circuit CC may control the amount of electrical current flowing through the light emitting element OLED in response to the data voltage.

The light emitting element OLED generates and/or emits light at a predetermined luminance corresponding to the amount of electrical current supplied from the pixel circuit CC. For this, the level of a first voltage ELVDD may be set higher than the level of a second voltage ELVSS.

Each of the transistors T1 to T7 may include an input electrode (or a source electrode), an output electrode (or a drain electrode), and a control electrode (or a gate electrode). In the specification, for convenience, either the input electrode or the output electrode may be referred to as a first electrode and the other may be referred to as a second electrode.

The first electrode of the first transistor T1 may be connected to the power line PL to which the first voltage ELVDD is applied through the fifth transistor T5. The second electrode may be connected to the anode electrode of the light emitting element OLED through the sixth transistor T6. The first transistor T1 may be defined as a driving transistor. The first transistor T1 may control the amount of electrical current flowing through the light emitting element OLED according to the voltage applied to the control electrode of the first transistor T1.

The second transistor T2 may be connected between a data line DL and the first electrode of the first transistor T1, and the control electrode of the second transistor T2 may be connected to an i-th scan line SLi. The second transistor T2 may be turned on by receiving the i-th scan signal (Si) through the i-th scan line SLi to electrically connect the data line DL and the first electrode of the first transistor T1.

The third transistor T3 may be connected between the second electrode and the control electrode of the first transistor T1. The control electrode of the third transistor T3 may be connected to the i-th scan line SLi. The third transistor T3 may be turned on by receiving the i-th scan signal (Si) through the i-th scan line SLi to electrically connect the second electrode to the control electrode of the first transistor T1. When the third transistor T3 is turned on, the first transistor T1 may be connected in the form of a diode.

The fourth transistor T4 may be connected between a node ND and an initialization power generation unit (not shown). The control electrode of the fourth transistor T4 may be connected to the i–1th scan line SLi−1. The fourth transistor T4 may be turned on by receiving the (i−1)-th scan signal (Si−1) through the (i−1)-th scan line SLi−1 to provide an initialization voltage Vint to the node ND.

The fifth transistor T5 may be connected between the power line PL and the first electrode of the first transistor T1. The control electrode of the fifth transistor T5 may be connected to the i-th emission line ELi.

The sixth transistor T6 may be connected between the second electrode of the first transistor T1 and the anode electrode of the light emitting element OLED. The control electrode of the sixth transistor T6 may be connected to the i-th emission line ELi.

The seventh transistor T7 is connected between the initialization power generation unit (not shown) and the anode electrode of the light emitting element OLED. The control electrode of the seventh transistor T7 may be connected to the (i+1)-th scan line SLi+1. The seventh transistor T7 receives the (i+1)-th scan signal (Si+1) through an (i+1)-th scan line SLi+1 and is turned on to provide the initialization voltage Vint to the anode electrode of the light emitting element OLED.

The capacitor CP may be disposed between the power line PL and the node ND. The capacitor CP may store a data voltage. When the fifth transistor T5 and the sixth transistor T6 are turned on according to the voltage stored in the capacitor CP, the amount of electrical current flowing through the first transistor T1 can be determined.

In FIG. 7, the transistors T1 to T7 are shown based on a P-type metal-oxide-semiconductor ("PMOS"). However, the invention is not limited thereto and in another embodiment of the invention, the transistors T1 to T7 may include a N-type metal-oxide-semiconductor "(NMOS")".

Figure 8:
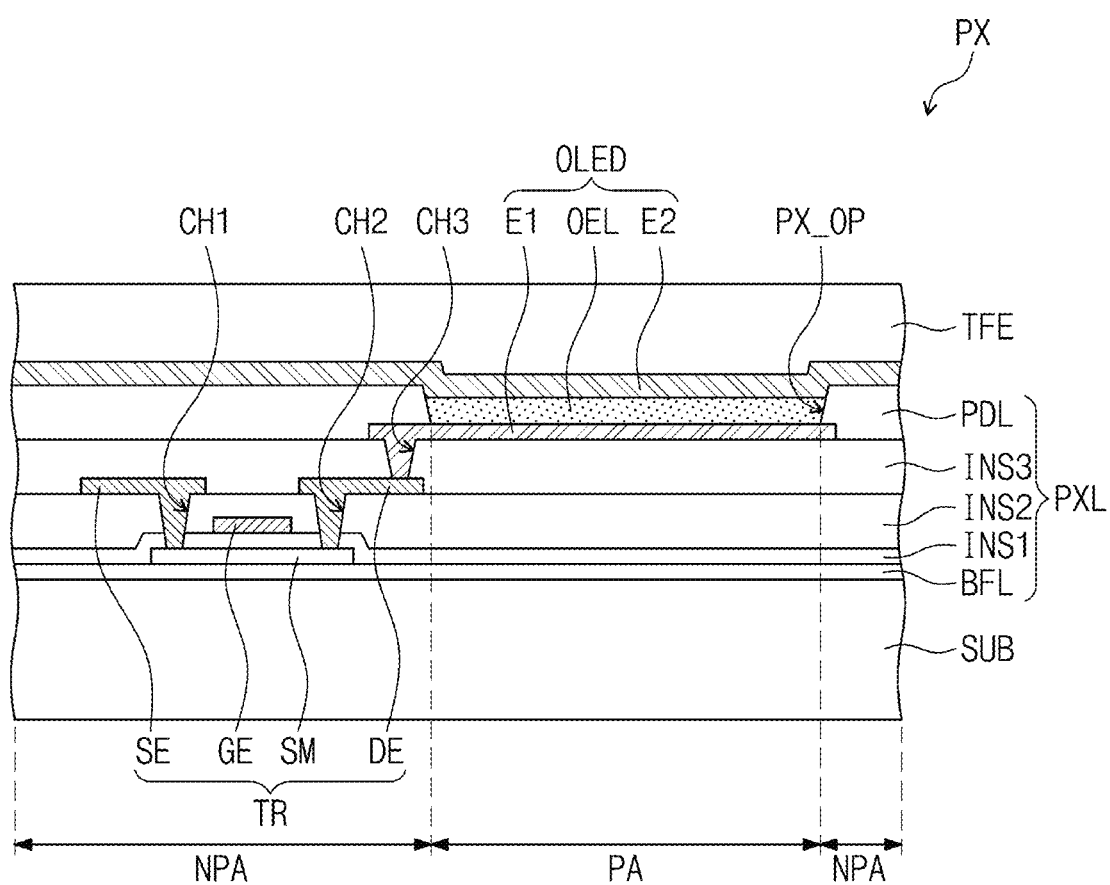
FIG. 8 is an enlarged cross-sectional view of an embodiment of the pixel of FIG. 7.

FIG. 8 is an enlarged cross-sectional view of an embodiment of the pixel PX of FIG. 7. Referring to FIG. 8, a pixel PX includes a light emitting element OLED and a transistor TR which is connected to the light emitting element OLED. The light emitting element OLED may include a first electrode E1, a second electrode E2, and light emitting layer such as an organic light emitting layer OEL disposed between the first electrode E1 and the second electrode E2. The transistor TR may be a sixth transistor T6 shown in FIG. 7. The light emitting element OLED may be defined as an organic light emitting element.

The first electrode E1 may be an anode electrode, and the second electrode E2 may be a cathode electrode. The first electrode E1 may be defined as a pixel electrode, and the second electrode E2 may be defined as a common electrode.

The pixel PX may be divided into a pixel area PA and a non-pixel area NPA which is adjacent to the pixel area PA. The light emitting element OLED may be disposed in the pixel area PA, and the transistor TR may be disposed in the non-pixel area NPA. The pixel area PA may be a region within the pixel PX at which light is generated and/or emitted, while the non-pixel area NPA may be a region within the pixel PX at which light is not generated and/or not emitted.

The transistor TR and the light emitting element OLED may be disposed on the substrate SUB. A buffer layer BFL is disposed on the substrate SUB, and the buffer layer BFL may include an inorganic material.

A semiconductor layer SM of the transistor TR may be disposed on the buffer layer BFL. The semiconductor layer SM may include a semiconductor of an inorganic material such as amorphous silicon or poly silicon, or an organic semiconductor. Additionally, the semiconductor layer SM may include an oxide semiconductor. Although not shown in FIG. 8, the semiconductor layer SM may include a source area, a drain area, and a channel area which is between the source area and the drain area.

A first insulating layer INS1 may be disposed on the buffer layer BFL so as to cover the semiconductor layer SM. The first insulating layer INS1 may include an inorganic material. A gate electrode GE of the transistor TR overlapping the semiconductor layer SM may be disposed on the first insulating layer INS1. The gate electrode GE may be disposed to overlap or correspond to the channel area of the semiconductor layer SM.

A second insulating layer INS2 may be disposed on the first insulating layer INS1 to cover the gate electrode GE. The second insulating layer INS2 may include an organic material and/or an inorganic material.

A source electrode SE and a drain electrode DE of the transistor TR may be spaced from each other along the substrate SUB and disposed on the second insulating layer INS2. The source electrode SE may be connected to the source area of the semiconductor layer SM through or at a first contact hole CH1 that is defined in the first insulating layer INS1 and the second insulating layer INS2. The drain electrode DE may be connected to the drain area of the semiconductor layer SM through or at a second contact hole CH2 that is defined in the first insulating layer INS1 and the second insulating layer INS2.

A third insulating layer INS3 may be disposed on the second insulating layer INS2 to cover the source electrode SE and the drain electrode DE of the transistor TR. The third insulating layer INS3 may be defined by a planarization film that provides a flat upper surface, and may include organic materials.

The first electrode E1 may be disposed on the third insulating layer INS3. The first electrode E1 may be connected to the drain electrode DE of the transistor TR through or at a third contact hole CH3 defined in the third insulating layer INS3.

A pixel defining layer PDL exposing a predetermined portion of the first electrode E1 may be disposed on the first electrode E1 and the third insulating layer INS3. A pixel opening part PX_OP (e.g., pixel opening) at which a predetermined portion of the first electrode E1 is exposed outside the pixel defining layer PDL, may be defined in the pixel defining layer PDL.

The organic light emitting layer OEL may be disposed on the first electrode E1 in the pixel opening part PX_OP. The organic light emitting layer OEL may generate light of a red, green, and/or blue color. However, the invention is not limited thereto and the organic light emitting layer OEL may generate white light by a combination of organic materials generating red, green, and blue color light.

A second electrode E2 may be disposed on the pixel defining layer PDL and the organic light emitting layer OEL. The thin film sealing layer TFE may be disposed on the light emitting element OLED to cover the pixel PX. The layer between the substrate SUB and the thin film sealing layer TFE may be defined as a pixel layer PXL.

The first voltage ELVDD may be applied to the first electrode E1, and the second voltage ELVSS may be applied to the second electrode E2. An exciton is formed as holes and electrons injected to the organic light emitting layer OEL are combined, and the light emitting element OLED may emit light as the excitons transition to the ground state. The light emitting element OLED emits red, green, and blue light according to the flow of electrical current, thereby displaying an image IM.

Figure 9:
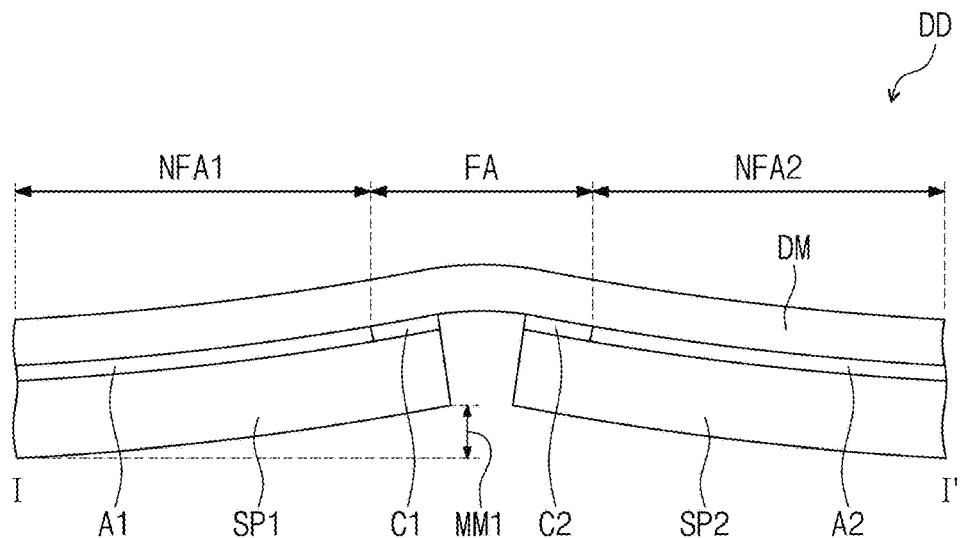
FIG. 9 is an enlarged cross-sectional view taken along line I-I' of FIG. 3.

FIG. 9 is an enlarged cross-sectional view of an embodiment of the display device DD taken along line I-I' of FIG. 3. FIG. 9 is a diagram illustrating the display device DD of FIG. 3, which is unfolded. Referring to FIG. 9, a display device DD includes a display module DM, a first supporter SP1, a second supporter SP2, a first adhesive layer A1 and a second adhesive layer A2 (e.g., first and second adhesive layers A1 and A2), and a first compensation layer C1 and a second compensation layer C2 (e.g., first and second compensation layers C1 and C2). The display module DM, the first supporter SP1, and the second supporter SP2 correspond to the display module DM, the first supporter SP1, and the second supporter SP2 of FIG. 3. For convenience of description, a folding structure FS such as the first and second connection parts CP1 and CP2 and the hinge parts HG of FIG. 3 is omitted in FIG. 9.

The first supporter SP1 may overlap or correspond to the first non-folding area NFA1 and a portion of the folding area FA. At least a portion of the first supporter SP1 may be bent to have a predetermined curvature. That is, the display device DD which is disposed unfolded includes the first supporter SP1 bent at a region thereof closest to the folding area FA.

The first supporter SP1 may be bent based on a bending axis parallel to the folding axis FX. The first supporter SP1 may be bent to have a center of curvature at the front surface of the display module DM. That is, a center of curvature or a bending axis may be provided or formed in the display module DM. The first supporter SP1 may include a first portion corresponding to the first non-folding area NFA1, and a second portion corresponding to the folding area FA. The first supporter SP1 may include a boundary between the first portion and the second portion. The first portion and the second portion may define an entirety of the first supporter SP1 without being limited thereto. At the boundary, the first portion and the second portion together may form one single, continuous curved surface within the display device DD which is disposed unfolded or flat. In an embodiment, at the boundary, the first portion and the second portion may together form a curvature of the first supporter SP1 having a center of curvature at the front surface of the display module DM.

The second portion of the first supporter SP1 may protrude from the first portion thereof, along both the second direction DR2 and the third direction DR3. As a result, the second portion may protrude in the third direction DR3 relative to the first portion. The first supporter SP1 may be biased in a bent form as described above, even when the display device DD is disposed flat or unfolded. The first supporter SP1 may be disposed between the first connection part CP1 (FIG. 3) and the display module DM, and the second portion may be spaced apart from the first connection part CP1 (FIG. 3), along a thickness direction of the display device DD which is flat or unfolded. A portion of the first portion of the first supporter SP1 may contact a protection layer (not shown) disposed on the first connection part CP1 of FIG. 3 or may contact the first connection part CP1 of FIG. 3 without the protection layer therebetween.

The first supporter SP1 which is bent within the display device DD which is flat or unfolded, includes a lower surface furthest from the display module DM and facing the folding structure FS. The lower surface of the first supporter SP1 which is bent, defines a lowest point furthest from the display module DM (e.g., closest to the folding structure FS) and a highest point closest to the display module DM (e.g., furthest from the folding structure FS). Along the third direction DR3, a distance MM1 between the lowest point and the highest point of the lower surface of the first supporter SP1 is defined. The distance MM1 may be defined between two parallel planes in which the lowest point and the highest point of the lower surface of the first supporter SP1 are respectively defined. Referring to FIG. 9, for example, horizontal dotted lines between which the distance MM1 is indicated, may represent the two parallel planes. The distance MM1 may be a maximum distance between the lowest point and the highest point of the lower surface of the first supporter SP1. In an embodiment, the display module DM which is unfolded defines a single plane facing the display module DM with the first supporter SP1 therebetween, the lower surface of the first supporter SP1 at the second portion, defines a lowest point of the first supporter SP1 which is closest to the single plane, and the lower surface of the first supporter SP1 at the first portion, defines a highest point of the first supporter SP1 which is furthest from the single plane.

The distance MM1 may be provided within a reference range so that the bending of the display module DM at the folding area FA within the display device DD which is flat or unfolded, is not visually recognizable from outside the display module DM. In an embodiment, the distance MM1 may be about 0.5 millimeter (mm) or less. The distance MM1 and structure described above may be applied to the second supporter SP2, without being limited thereto.

The second supporter SP2 may overlap or correspond to the second non-folding area NFA2 and a portion of the folding area FA. At least a portion of the second supporter SP2 may be bent to have a predetermined curvature. That is, the display device DD which is disposed unfolded includes the second supporter SP2 bent at a region thereof closest to the folding area FA.

The second supporter SP2 may be bent based on a bending axis parallel to the folding axis FX. Like the first supporter SP1, the second supporter SP2 may be bent to have a center of curvature at the front surface of the display module DM. The second supporter SP2 may include a third portion corresponding to the second non-folding area NFA2, and a fourth portion corresponding to the folding area FA. The third portion and the fourth portion may define an entirety of the second supporter SP2 without being limited thereto. The third portion and the fourth portion together may form one single, continuous curved surface within the display device DD which is disposed unfolded or flat.

The fourth portion of the second supporter SP2 may protrude from the third portion thereof, along both the second direction DR2 and the third direction DR3. As a result, the fourth portion may protrude in the third direction DR3 relative to the third. The second supporter SP2 may be disposed between the second connection part CP2 (FIG. 3) and the display module DM, and the fourth portion may be spaced apart from the second connection part CP2 (FIG. 3), along a thickness direction of the display device DD which is flat or unfolded. A portion of the third portion of the second supporter SP2 may contact a protection layer (not shown) disposed on the second connection part CP2 of FIG. 3 or may contact the second connection part CP2 of FIG. 3 without the protection layer therebetween.

The display module DM may be bendable depending on the shapes of the first supporter SP1 and the second supporter SP2. Like the first supporter SP1, the first non-folding area NFA1 of the display module DM may be bendable to have a center of curvature at the front surface of the display module DM. Like the second supporter SP2, the second non-folding area NFA2 of the display module DM may be bendable to have a center of curvature at the front surface of the display module DM. Accordingly, a portion of the folding area FA of the display module DM may be bendable to have at least one center of curvature below the rear surface of the display module DM. That is, the folding area FA of the display module DM may protrude further in the third direction DR3 relative to the first and second non-folding areas NFA1 and NFA2. Effects of the shapes of the first and second supporters SP1 and SP2 and the display module DM will be described later with reference to FIG. 11.

A first adhesive layer A1 (e.g., first attachment member) is disposed between the first non-folding area NFA1 and the first supporter SP1. The first adhesive layer A1 is attached to the first non-folding area NFA1 and to the first supporter SP1, and attaches the first supporter SP1 to the display module DM at the first non-folding area NFA1. A second adhesive layer A2 (e.g., second attachment member) is disposed between the second non-folding area NFA2 and the second supporter SP2. The second adhesive layer A2 is attached to the second non-folding area NFA2 and to the second supporter SP2, and attaches the second supporter SP2 to the display module DM at the second non-folding area NFA2. Referring to FIG. 9, the first adhesive layer A1 corresponding to the first non-folding area NFA1 of the display module DM, may terminate at the folding area FA to be spaced apart from an inner edge or inner side surface of the first supporter SP1. An inner region of the first supporter SP1 may be exposed outside the first adhesive layer A1 at the folding area FA. Similarly, the second adhesive layer A2 corresponding to the second non-folding area NFA2 of the display module DM, may terminate at the folding area FA to be spaced apart from an inner edge or inner side surface of the second supporter SP2. An inner region of the second supporter SP2 may be exposed outside the second adhesive layer A2 at the folding area FA.

By the first and second adhesive layers A1 and A2, the first and second non-folding areas NFA1 and NFA2 of the display module DM are bent along the first and second supporters SP1 and SP2 to correspond to the portions thereof providing the one single, continuous curved surface. In addition, a stress acting on the display module DM when the display device DD is folded can be absorbed by the first and second supporters SP1 and SP2 through the first and second adhesive layers A1 and A2. That is, the first supporter SP1 which is bent within the display device DD which is flat or unfolded, disposes the first non-folding area NFA1 bent corresponding to the portions of the first supporter SP1 which provide the one single, continuous curved surface. Similarly, the second supporter SP2 which is bent within the display device DD which is flat or unfolded, disposes the second non-folding area NFA2 bent corresponding to the portions of the second supporter SP2 which provide the one single, continuous curved surface.

A first compensation layer C1 is disposed between the folding area FA of the display module DM and the first supporter SP1. The first compensation layer C1 is attached to the first supporter SP1 at the second portion thereof. The first compensation layer C1 is unattached to the display module DM at the folding area FA thereof. The second compensation layer C2 is disposed between the folding area FA of the display module DM and the second supporter SP2. The second compensation layer C2 is attached to the second supporter SP2 at the fourth portion thereof. The second compensation layer C2 is unattached to the display module DM at the folding area FA thereof. The first and second compensation layers C1 and C2 may reduce or effectively prevent direct contact (e.g., an interface) of the first and second supporters SP1 and SP2 with the display module DM, especially at the folding area FA thereof.

Thicknesses of the first and second compensation layers C1 and C2 may correspond to thicknesses of the first and second adhesive layers A1 and A2, respectively. The first and second compensation layers C1 and C2 may not be attached to the display module DM, at the folding area FA thereof. Accordingly, the first and second compensation layers C1 and C2 may not limit the bending of the folding area FA of the display module DM in folding or unfolding of the display device DD.

Figure 10:
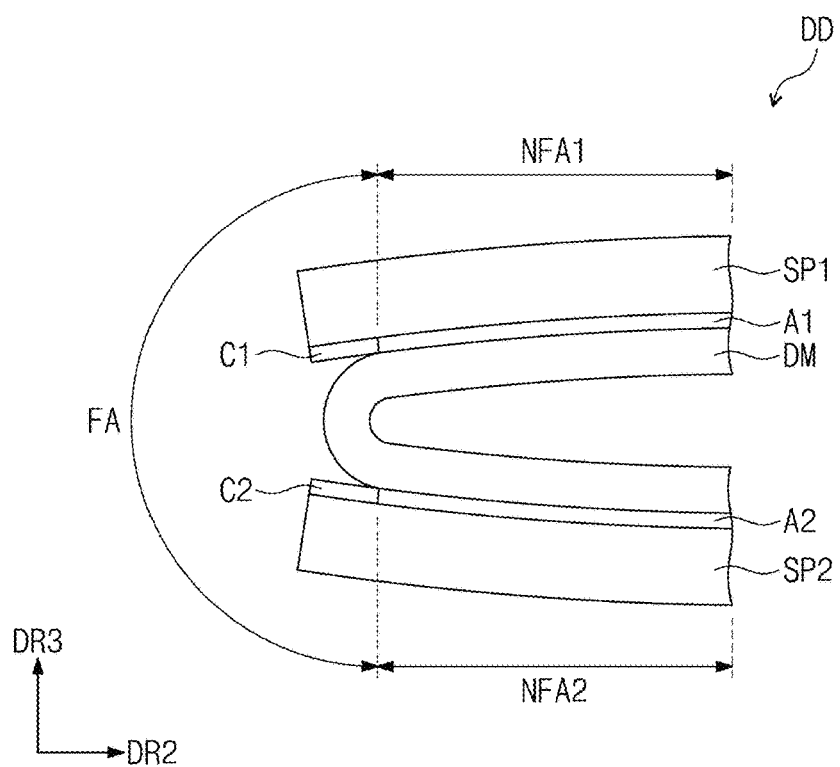
FIG. 10 is an enlarged cross-sectional view illustrating an embodiment of the display device of FIG. 9, which is folded.

FIG. 10 is a cross-sectional view of an embodiment of an end portion of the display device of FIG. 9, which is folded. Referring to FIG. 10, the display device DD may be infolded, and portions of the first non-folding area NFA1 and the second non-folding area NFA2 may face each other along the third direction DR3. The display device DD and the components thereof at the folding area FA may be folded about a folding axis FX. A length (e.g., extension direction) of the folding axis FX may cross each of the second direction DR2 and the third direction DR3. In an embodiment, the length (e.g., extension direction) of the folding axis FX may be perpendicular to the second direction DR2 and the third direction DR3, without being limited thereto.

The display device DD which is folded disposes the first and second compensation layers C1 and C2 spaced apart from the display module DM. That is, since the first and second compensation layers C1 and C2 are not attached to the display module DM at the folding area FA thereof, the first and second compensation layers C1 and C2 spaced apart from the display module DM at the folding area FA thereof. The display device DD which is folded disposes the first adhesive layer A1 and the second adhesive layer A2 attached to both the display module DM and the folding structure FS.

When folded, the first non-folding area NFA1 of the display module DM may be stressed in a direction from the first supporter SP1 to the front surface of the display module DM. In addition, the second non-folding area NFA2 of the display module DM may be stressed in a direction from the second supporter SP2 to the front surface of the display module DM. The first and second supporters SP1 and SP2 may absorb at least some of these stresses.

Figure 11:
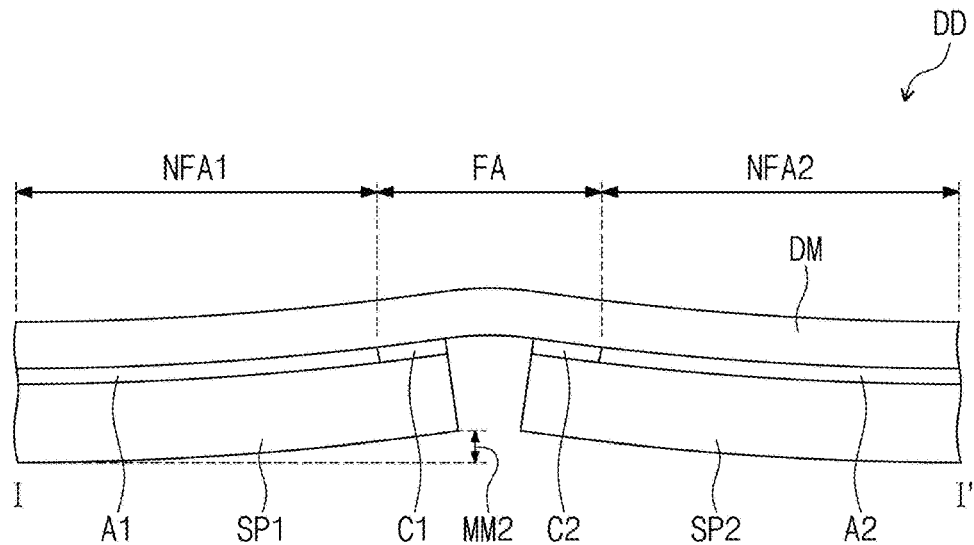
FIG. 11 is a cross-sectional view of an embodiment of a display device which has been repeatedly folded and folded between the structures shown in FIGS. 9 and 10.
Figure 11:
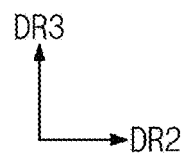

FIG. 11 is an enlarged cross-sectional view of an embodiment of a display device DD which has been repeatedly folded and folded between the structures shown in FIGS. 9 and 10. FIG. 11 is a diagram illustrating the display device DD which is unfolded after the repeated folding and unfolding described above. The display device DD includes a display module DM, a first supporter SP1, a second supporter SP2, first and second adhesive layers A1 and A2, and first and second compensation layers C1 and C2, which variously correspond to the components of FIG. 9 and FIG. 10 described above.

Referring to FIG. 11, a distance MM2 between the lowest point and the highest point of the lower surface of the first supporter SP1 is defined along the third direction DR3. The distance MM2 of FIG. 11 may be smaller than the distance MM1 of FIG. 9. When folding and unfolding of the display device DD are repeated, stress is applied to the first and second supporters SP1 and SP2 repeatedly. As described with reference to FIG. 10, the first non-folding area NFA1 and the second non-folding area NFA2 of the display module DM may be stressed along the third direction DR3. Accordingly, the distance MM2 is reduced as compared to an original distance MM1, and the deformation of the display module DM is correspondingly reduced. That is, the display device DD which is repeatedly folded and unfolded disposes a distance between the lowest point and the highest point of the lower surface of the module supporter SP to be less than a distance before the repeated folding and unfolding. Therefore, one or more embodiment of the display device DD provides reduced deformation of the display module DM due to folding and/or unfolding thereof.

Even if folding and unfolding of the display device DD are repeated, the first and second supporters SP1 and SP2 may not be bent in reverse (e.g., extend in a direction opposite to the third direction DR3 shown in FIGS. 9-11). That is, the bending axis provided or formed at a front surface of the display module DM may not change to be disposed below the display module DM (e.g., at a rear surface opposite to the display surface DS). The first and second connection parts CP1 and CP2 illustrated in FIGS. 3 and 4 support the curvatures of the first and second supporters SP1 and SP2 such that inversion thereof can be reduced or effectively prevented. For this, the first and second connection parts CP1 and CP2 may be non-bendable by way of example, and may be combined with the first and second supporters SP1 and SP2, respectively, to reduced or effectively prevent inversion of the first and second supporters SP1 and SP2.

Figure 12:
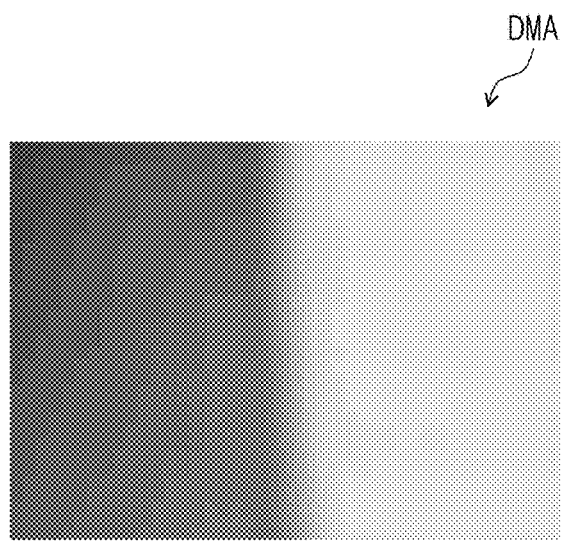
FIG. 12 is an image of an embodiment of the display module of FIG. 11 photographed on a plane.
Figure 12:
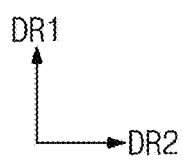

FIG. 12 is an image of an embodiment of the display module DM of FIG. 11 photographed on a plane. Referring to FIG. 12, in the image DMA, the black image is an image including the first non-folding area NFA1 of FIG. 11, and the white image may be an image including the second non-folding area NFA2 of FIG. 9. A boundary between the black image and the white image in FIG. 12 may be provided at the folding area FA of the display module DM. The image DMA may be understood as a depth map for the display module DM. For convenience of explanation, with reference to the reference numerals of FIG. 11, FIG. 12 will be further described.

Except for the boundary between the black image and the white image, the image DMA appears to have a constant depth. That is, the planar area where the depth is changed is limited to the corresponding boundary, and the corresponding boundary may not be substantially visually recognized from outside the display module DM. Furthermore, even when folding and unfolding are repeated according to the use or test of the display device DD, as described above, the deformation of the display module DM after such repeated folding and unfolding is reduced. Therefore, deformation of the display module DM which is visible from outside the display module DM can be further reduced, and the quality of the display device DD can be improved.

Figure 13:
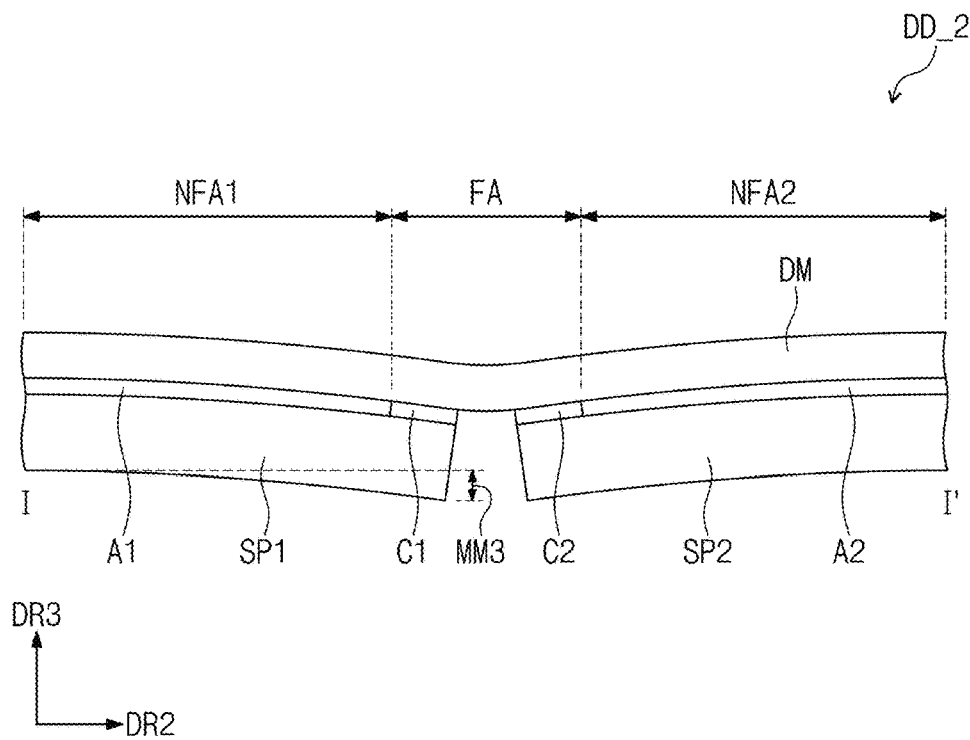
FIG. 13 is an enlarged cross-sectional view of an embodiment of a display device including supporters having a curvature inverted from the display device of FIG. 9.
Figure 14:
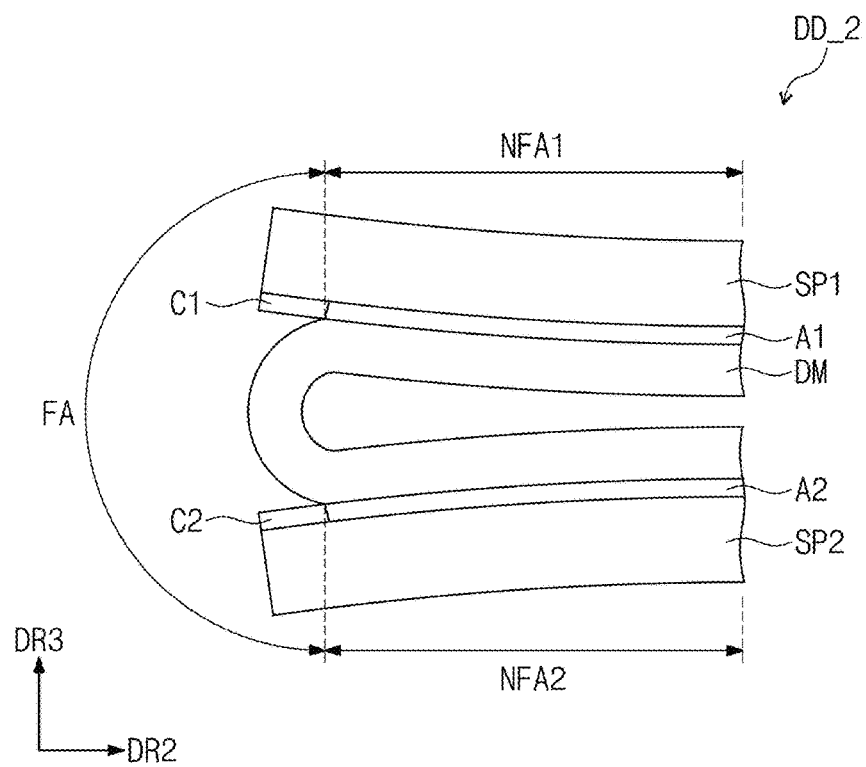
FIG. 14 is an enlarged cross-sectional view illustrating an embodiment of the display device of FIG. 13, which is folded.
Figure 15:
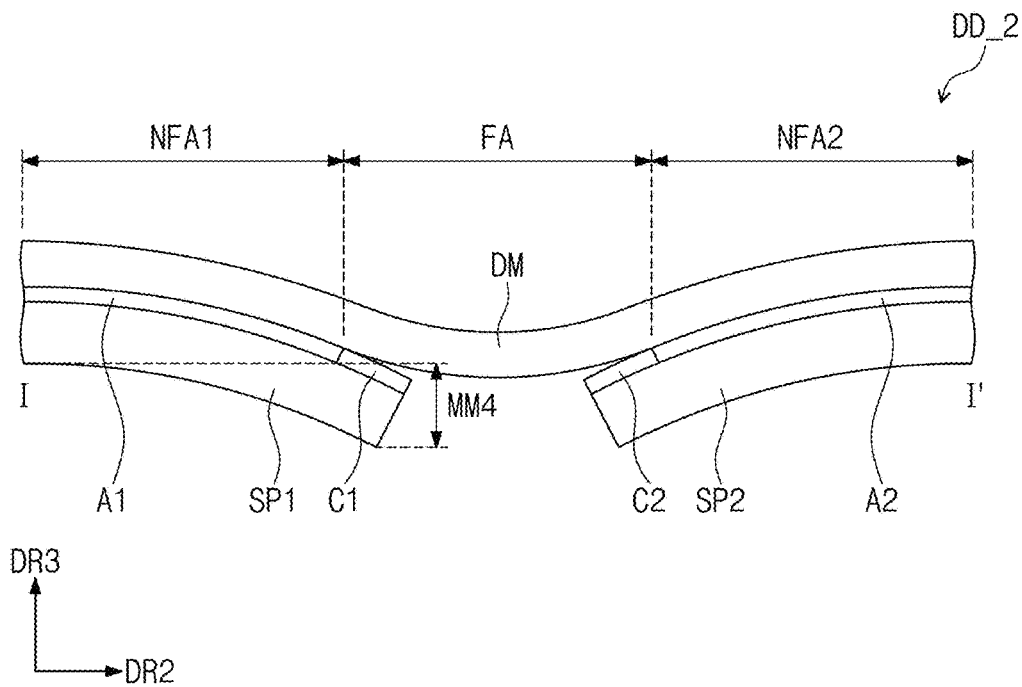
FIG. 15 is an enlarged cross-sectional view of an embodiment of a display device which has been repeatedly folded and folded between the structures shown in FIGS. 13 and 14.
Figure 16:
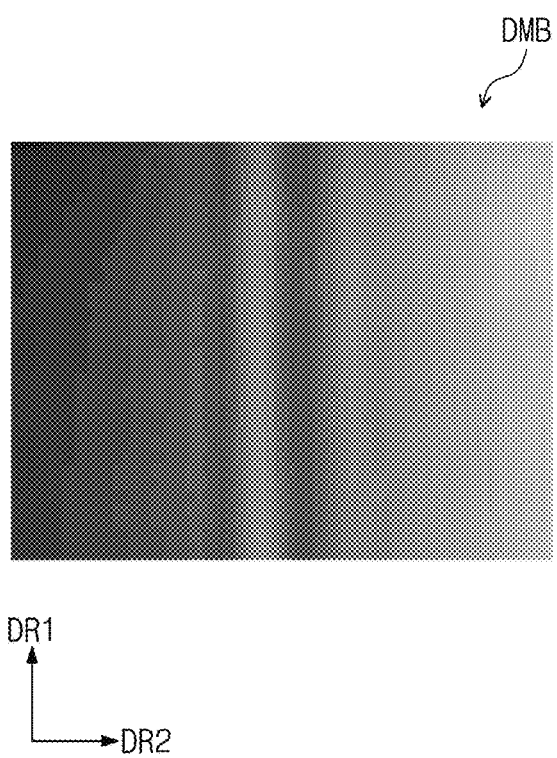
FIG. 16 is an image of an embodiment of the display module of FIG. 15 photographed on a plane.

FIG. 13 is an enlarged cross-sectional view of a display device DD_2 including supporters having a curvature inverted as compared to the curvature in the display device DD of FIG. 9. FIG. 14 is a cross-sectional view of an embodiment of an end portion of the display device DD_2 of FIG. 13, which is folded. FIG. 15 is an enlarged cross-sectional view of a display device DD_2 which has been repeatedly folded and folded between the structures shown in FIGS. 13 and 14. FIG. 16 is an image of an embodiment of the display module DM of FIG. 15 photographed on a plane. Compared to FIGS. 13 to 16, effects of embodiments of the display device DD will be described.

Referring to FIG. 13, the display device DD_2 includes a display module DM, a first supporter SP1, a second supporter SP2, first and second adhesive layers A1 and A2, and first and second compensation layers C1 and C2, which variously correspond to the components of FIG. 9, respectively. Compared to the first and second supporters SP1 and SP2 of FIG. 9, the first and second supporters SP1 and SP2 of FIG. 13 are bent in reverse. That is, a bending axis or a center of curvature of the first and second supporters SP1 and SP2 is provided below the rear surface of the first and second supporters SP1 and SP2. As a result, the first non-folding area NFA1 and the second non-folding area NFA2 of the display module DM may protrude in the third direction DR3 relative to the folding area FA. Accordingly, a distance MM3 between the lowest point and the highest point of the lower surface of the first supporter SP1 may be defined based along the third direction DR3.

Referring to FIG. 14, the display device DD_2 may be infolded, and the first non-folding area NFA1 and portions of the second non-folding area NFA2 may face each other. When folded, the first non-folding area NFA1 of the display module DM may be stressed in a direction from the first supporter SP1 to the front surface of the display module DM. In addition, the second non-folding area NFA2 of the display module DM may be stressed in a direction from the second supporter SP2 to the front surface of the display module DM. The first and second supporters SP1 and SP2 may absorb at least some of these stresses.

Referring to FIG. 15, a distance MM4 between the lowest point and the highest point of the lower surface of the first supporter SP1 may be defined. The distance MM4 of FIG. 15 may be greater than the distance MM3 of FIG. 13. When folding and unfolding of the display device DD_2 are repeated, stress is applied to the first and second supporters SP1 and SP2 repeatedly. As a result, the distance MM4 increases from an original distance MM3 and the deformation of the display module DM is intensified.

Referring to FIG. 16, the image DMB may be understood as a depth map for the display module DM in FIG. 15. Unlike FIG. 12, three distinct lines appear in the image DMB, which are extended along the first direction DR1. Two white lines facing each other along the second direction DR2 with a black line therebetween may represent a boundary between the first non-folding area NFA1 and the folding area FA and a boundary between the second non-folding area NFA2 and the folding area FA, respectively. The middle black line may be provided in the folding area FA.

Compared with the image DMA of FIG. 12, the image DMB of FIG. 16 varies in depth along a wider area. Furthermore, when folding and unfolding are repeated according to the use or test of the display device DD_2, the deformation of the display module DM within the display device DD_2 is intensified. Therefore, the deformation of the display module DM can be visually recognized from outside the display module DM. That is, one or more embodiment of the display device DD can reduce the deformation of the display module DM and improve the quality thereof through the bending structures of the first and second supporters SP1 and SP2.

As described above, one or more embodiment of the display device DD provides a reduction in deformation of the display device DD due to repeated folding and unfolding thereof, and the quality of the display device DD may be improved.

Although embodiments of the invention have been described, it is understood that the invention should not be limited to these embodiments but various changes and modifications can be made by one ordinary skilled in the art within the spirit and scope of the invention as hereinafter claimed.

What is claimed is:

1. A display device comprising:
   a display module which displays an image at a front surface of the display module, the display module including:
      a rear surface opposite to the front surface,
      a folding area at which the display module is foldable and unfoldable, and
      a non-folding area extended from the folding area; and
   a supporter facing the rear surface of the display module, the supporter including:
      a first portion corresponding to the non-folding area of the display module,
      a second portion extended from the first portion to correspond to the folding area of the display module, and
      a boundary between the first portion and the second portion,
   wherein
   the display module which is unfolded disposes the supporter bent at the boundary, and
   the supporter which is bent includes the first portion and the second portion together forming a curvature of the supporter having a center of curvature at the front surface of the display module.

2. The display device of claim 1, wherein the display module which is unfolded disposes the non-folding area bent to have a center of curvature at the front surface.

3. The display device of claim 1, wherein the display module which is unfolded disposes the folding area bent to have a center of curvature below the rear surface of the display module.

4. The display device of claim 1, wherein the supporter which is bent further includes:
   an upper surface facing the display module and a lower surface opposite to the upper surface, and
   the lower surface of the supporter at the first portion and at the second portion thereof, together provide a continuous curved surface having the center of curvature at the front surface of the display module.

5. The display device of claim 4, further including a single plane facing the display module with the supporter therebetween,
   wherein the supporter which is bent further includes:
   the lower surface at the second portion defining a lowest point of the supporter which is closest to the single plane, and
   the lower surface at the first portion defining a highest point of the supporter which is furthest from the single plane.

6. The display device of claim 5, wherein the display module which is unfolded disposes a maximum distance between the lowest point of the supporter and the highest point of the supporter of about 0.5 millimeter or less.

7. The display device of claim 1, wherein
   the non-folding area of the display module is provided in plurality including a first non-folding area and a second non-folding area opposing each other with the folding area therebetween,
   the supporter which is bent is provided in plural including a first supporter corresponding to the first non-folding area and a second supporter corresponding to the second non-folding area, and
   the first supporter and the second supporter are spaced apart from each other at the folding area.

8. The display device of claim 7, further comprising a folding structure with which folding and unfolding of the display module is controllable, the folding structure facing the display module with the supporter therebetween and including:
   a first connection portion corresponding to the first non-folding area and extending from the first non-folding area to correspond to the folding area,
   a second connection portion corresponding to the second non-folding area and extending from the second non-folding area to correspond to the folding area, and
   a hinge portion which corresponds to the folding area and couples the first connection portion and the second connection portion to each other,
   wherein the display module which is unfolded disposes each of the first connection portion and the second connection portion flat.

9. The display device of claim 8, wherein the second portion of the supporter is spaced apart from the folding structure, at the folding area of the display module.

10. The display device of claim 8, wherein the display module which is folded disposes the first connection portion and the second connection portion facing each other, with both of the first non-folding area and the second non-folding area of the display module therebetween.

11. The display device of claim 7, wherein
the display module is foldable at the folding area with respect to a folding axis, and
the supporter further includes:
- a first bending axis about which the first supporter is bendable, the first bending axis parallel to the folding axis, and
- a second bending axis about which the second supporter is bendable, the second bending axis parallel to the folding axis.

12. The display device of claim 1, further comprising:
an adhesive layer between the non-folding area of the display module and the supporter, and
a compensation layer between the folding area of the display module and the supporter,
wherein
- the adhesive layer is attached to the supporter and to the display module at the non-folding area thereof, to attach the supporter to the display module, and
- the compensation layer is attached to the supporter and unattached to the display module at the folding area thereof.

13. A display device comprising:
a display module which displays an image at a front surface of the display module, the display module including:
- a rear surface opposite to the front surface,
- a folding area at which the display module is foldable and unfoldable, and
- a non-folding area extended from the folding area;

a supporter facing the rear surface of the display module, the supporter including:
- a first portion corresponding to the non-folding area of the display module,
- a second portion extended from the first portion to correspond to the folding area of the display module, and
- a boundary between the first portion and the second portion; and a folding structure with which folding and unfolding of the display module is controllable, the folding structure facing the display module with the supporter therebetween and including:
- a connection portion corresponding to the non-folding area and extending from the non-folding area to correspond to the folding area, and
- a hinge portion which corresponds to the folding area,
wherein
- the display module which is unfolded disposes the supporter bent at the boundary and disposes the connection portion flat, and
- the supporter which bent includes the second portion protruded further from the connection portion than the first portion, in a direction from the connection portion to the front surface of the display module.

14. The display device of claim 13, wherein the supporter which is bent includes the first portion and the second portion together forming a curvature of the supporter having a center of curvature at the front surface of the display module.

15. The display device of claim 13, wherein the display module which is unfolded disposes the non-folding area bent to have a center of curvature at the front surface.

16. The display device of claim 13, wherein the display module which is unfolded disposes the folding area bent to have a center of curvature below the rear surface of the display module.

17. The display device of claim 13, wherein the supporter which is bent further includes:
- an upper surface facing the display module and a lower surface opposite to the upper surface, and
- the lower surface of the supporter at the first portion and at the second portion thereof, together provide a continuous curved surface having a center of curvature at the front surface of the display module.

18. The display device of claim 13, further comprising:
an adhesive layer between the non-folding area of the display module and the supporter, and
a compensation layer between the folding area of the display module and the supporter,
wherein
- the adhesive layer is attached to the supporter and to the display module at the non-folding area thereof, to attach the supporter to the display module, and
- the compensation layer is attached to the supporter and unattached to the display module at the folding area thereof.

19. The display device of claim 18, wherein the display module which is folded disposes the compensation layer spaced apart from the display module at the folding area thereof.

20. The display device of claim 13, wherein in a top plan view of the display module which is folded, the hinge portion corresponds to the connection portion and is outside the supporter.

* * * * *